United States Patent
Schemmann

(10) Patent No.: US 8,908,786 B1
(45) Date of Patent: Dec. 9, 2014

(54) OPTIMIZED QAM TRANSMISSION

(71) Applicant: Marcel F. Schemmann, Marea Hoop (NL)

(72) Inventor: Marcel F. Schemmann, Marea Hoop (NL)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 13/650,209

(22) Filed: Oct. 12, 2012

Related U.S. Application Data

(60) Provisional application No. 61/656,031, filed on Jun. 6, 2012.

(51) Int. Cl.
*H04L 5/12* (2006.01)
*H04L 27/34* (2006.01)

(52) U.S. Cl.
CPC ............................... *H04L 27/34* (2013.01)
USPC ........................... 375/261; 375/260; 375/259

(58) Field of Classification Search
USPC ........................... 375/261, 260, 259
See application file for complete search history.

(56) References Cited

U.S. PATENT DOCUMENTS

| | | | | |
|---|---|---|---|---|
| 4,965,536 A * | 10/1990 | Yoshida | ......................... | 332/103 |
| 5,727,026 A * | 3/1998 | Beukema | ......................... | 375/296 |
| 5,990,738 A * | 11/1999 | Wright et al. | ................. | 330/149 |
| 8,196,010 B1 * | 6/2012 | Gunnam et al. | ............... | 714/758 |
| 2002/0129377 A1 * | 9/2002 | Cloonan et al. | ............... | 725/111 |
| 2004/0170228 A1 * | 9/2004 | Vadde | ............................ | 375/260 |
| 2010/0148828 A1 * | 6/2010 | Nagatani et al. | .............. | 327/105 |

* cited by examiner

*Primary Examiner* — Michael Neff
(74) *Attorney, Agent, or Firm* — Troy A. Van Aacken

(57) ABSTRACT

Systems and methods to optimize QAM transmission are provided. In some implementations, a QAM transmitter can operate to optimize QAM transmissions by reducing high peak signals levels via a QAM subgroup inversion. In additional implementations, systems and methods can provide for a QAM transmitter to optimize QAM transmissions by applying a recursive inversion process of QAM blocks to minimize peak output. In still further implementations, systems and methods can provide for a QAM transmitter to optimize QAM transmissions by suppressing QAM subgroups in a circular QAM constellation. Optimizing QAM transmission can provide enhancement in power efficiency of active transmission equipment thereby avoiding high peak signal levels and reducing the instances of clipping.

18 Claims, 10 Drawing Sheets

| Peak/RMS | No Subgr | 32 sub | 64 sub | 16sub | 256 Subgr | 2 Subgr | Peak/RMS | Sine wave |
|---|---|---|---|---|---|---|---|---|
| 2.981057143 | 0.000107 | 0.009617 | 0.018201 | 0.0054 | 0.049535 | 0.0028 | 1.4142136 | 1 |
| 3.4779 | 0.197584 | 0.918096 | 0.955565 | 0.830794 | 0.947765 | 0.481849 | 1.4142136 | 1.00E-07 |
| 3.974742857 | 0.593385 | 0.072274 | 0.026234 | 0.163539 | 0.0027 | 0.472816 | | |
| 4.471585714 | 0.182994 | 1.33E-05 | 9E-07 | 0.000267 | 1E-07 | 0.040801 | | |
| 4.968428571 | 0.023647 | 1E-10 | | 1E-08 | | 0.0017 | | |
| 5.465271429 | 0.002133 | | | | | 3.33E-05 | | |
| 5.962114286 | 0.000147 | | | | | 5E-07 | | |
| 6.458957143 | 3.33E-06 | | | | | | | |
| 8 | 1E-10 | | | | | | | |

| Peak/rms | Plain inv. | Inv. Iter. | OFDM ref. | Limited | Peak/rms | Plain inv. | Inv. Iter. | OFDM ref. | Limited |
|---|---|---|---|---|---|---|---|---|---|
| 2.713726 | 1 | 0.999067 | 1 | 0.999067 | 4.552056 | 0 | -8.1E-18 | 0.020067 | 0 |
| 2.801265 | 0.999987 | 0.983433 | 1 | 0.982566 | 4.639596 | 0 | -8.1E-18 | 0.013567 | 0 |
| 2.888805 | 0.99965 | 0.871296 | 1 | 0.866329 | 4.727135 | 0 | -8.1E-18 | 0.009267 | 0 |
| 2.976344 | 0.994243 | 0.561519 | 0.9999 | 0.538618 | 4.814675 | 0 | -8.1E-18 | 0.006034 | 0 |
| 3.063884 | 0.95917 | 0.223574 | 0.999267 | 0.157472 | 4.902214 | 0 | -8.1E-18 | 0.003867 | 0 |
| 3.151423 | 0.840736 | 0.052502 | 0.995767 | 1.00E-08 | 4.989754 | 0 | -8.1E-18 | 0.002467 | 0 |
| 3.238963 | 0.622005 | 0.0076 | 0.982199 | 0 | 5.077293 | 0 | -8.1E-18 | 0.0016 | 0 |
| 3.326502 | 0.368328 | 0.000967 | 0.951032 | 0 | 5.164833 | 0 | -8.1E-18 | 0.000867 | 0 |
| 3.414042 | 0.172207 | 0.0001 | 0.889363 | 0 | 5.252372 | 0 | -8.1E-18 | 0.000567 | 0 |
| 3.501582 | 0.064354 | 1.00E-05 | 0.797393 | 0 | 5.339912 | 0 | -8.1E-18 | 0.000433 | 0 |
| 3.589121 | 0.019277 | 5.00E-07 | 0.687156 | 0 | 5.427451 | 0 | -8.1E-18 | 0.000267 | 0 |
| 3.676661 | 0.00496 | -8.1E-18 | 0.566519 | 0 | 5.514991 | 0 | -8.1E-18 | 0.0001 | 0 |
| 3.7642 | 0.001093 | -8.1E-18 | 0.446915 | 0 | 5.60253 | 0 | -8.1E-18 | 6.67E-05 | 0 |
| 3.85174 | 0.00019 | -8.1E-18 | 0.340278 | 0 | 5.69007 | 0 | -8.1E-18 | 3.33E-05 | 0 |
| 3.939279 | 3.33E-05 | -8.1E-18 | 0.253775 | 0 | 5.77761 | 0 | -8.1E-18 | 3.33E-05 | 0 |
| 4.026819 | 6.67E-06 | -8.1E-18 | 0.183239 | 0 | 5.865149 | 0 | -8.1E-18 | -1.2E-16 | 0 |
| 4.114358 | 0.000001 | -8.1E-18 | 0.130538 | 0 | 5.952689 | 0 | -8.1E-18 | -1.2E-16 | 0 |
| 4.201898 | 0 | -8.1E-18 | 0.09227 | 0 | 6.040228 | 0 | -8.1E-18 | -1.2E-16 | 0 |
| 4.289437 | 0 | -8.1E-18 | 0.063602 | 0 | 6.127768 | 0 | -8.1E-18 | -1.2E-16 | 0 |
| 4.376977 | 0 | -8.1E-18 | 0.043735 | 0 | 6.215307 | 0 | -8.1E-18 | -1.2E-16 | 0 |
| 4.464516 | 0 | -8.1E-18 | 0.029301 | 0 | | | | | |

OPTIMIZED QAM TRANSMISSION

CROSS REFERENCE TO RELATED APPLICATION

This application claims the benefit of U.S. Provisional Application Ser. No. 61/656,031 entitled "Optimized Digital Cable Transmission Format," which was filed on Jun. 6, 2012, and is incorporated herein by reference in its entirety.

TECHNICAL FIELD

This disclosure relates to systems and methods to optimize QAM transmissions.

BACKGROUND

Digital cable transmission is typically performed with quadrature amplitude modulation (QAM) carriers such as QAM-256 or higher. The carrier frequencies can be arranged in various ways including orthogonal frequency-division multiplexing (OFDM). For instance, a standard can define the data transmission such as, for example, the digital video broadcasting—cable 2 (DVB-C2) standard, which utilizes a large number of OFDM carriers (e.g., thousands) that are each QAM modulated. For example, the standard can provide for an instance with QAM-4096 modulation; that is, a signal constellation of 4096 points. The higher-order the constellation, the more bits per symbol are transmitted and received. However, if the mean energy of the constellation is to remain the same, the points must be closer together and are thus more susceptible to noise and other corruption. This attribute can result in a higher bit error rate for a given carrier to noise ratio, and therefore higher-order QAM can deliver data less reliably than lower-order QAM for constant mean constellation energy.

The large number of OFDM carriers implies that each carrier has a narrow bandwidth and the symbol rate per carrier is low. However, OFDM modulation schemes are generally highly resilient in the presence of reflections within the symbol time of the modulation format. In the case of digital video broadcasting—terrestrial 2 (DVB-T2) that can be as long as 448 microseconds such that the transmission scheme is still effective even with multipath interference over distances exceeding 100 kilometers.

The OFDM scheme used in DVB-C2 originates from the DVB-T2 standard used for terrestrial broadcasting. However, in terrestrial television, broadcasting multipath interference occurs with large differential delays and narrowband interference can occur due to local interference from transmitters. To mitigate these effects an OFDM scheme with a long symbol time and a large number of narrowband carriers is optimal. While this leads to a high peak-average ratio for transmitted power, the transmission medium is linear and therefore is not problematic.

For cable transmission however, reflection distances are limited to a few kilometers at most. The transmission medium is shielded from external interference and the transmission medium has well-behaved characteristics (e.g., compared to terrestrial with multipath interference). Hence, there is no need for the very large number of OFDM carriers used in DVB-T2. On the other hand, the transmission medium contains active elements that cannot efficiently handle a high peak to average power ratio. In DVB-C2, measures are taken with auxiliary carriers that do not carry data to mitigate the peak-to-average power ratio problem of the standard.

Thus, the DVB-C2 standard may not be optimal for cable systems. QAM transmission as defined in DVB-C2 are more robust than required to account for reflections and interference, but sub-optimal with respect to efficient use of the power budget of active transmission equipment. Therefore, an alternate optimized QAM transmission can be implemented that better optimizes the peak-to-average power ratio such that better use can be made of the transmission channel. It should be understood that the methods described can apply to QAM transmissions not isolated to cable transmissions; that is, the presented systems and methods can pertain to any active mediums such as, for example, optical transmitters, amplifiers, digital subscriber lines, among many others.

DETAILED DESCRIPTION

Figure 1:
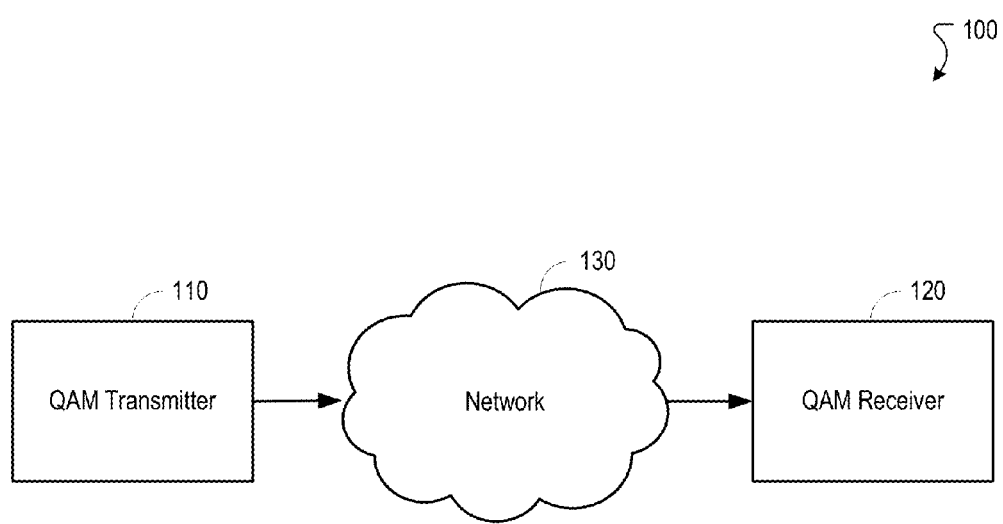
FIG. 1 is a block diagram illustrating a high-level broadband communications system for transmitting and receiving QAM signals.

Various implementations of this disclosure provide systems and methods to optimize QAM transmission. In some implementations, a QAM transmitter can operate to optimize QAM transmissions by reducing high peak signals levels via a QAM subgroup inversion. Optimizing QAM transmission can provide an enhancement in the power efficiency of active transmission equipment thereby avoiding high peak signal levels and reducing the instances of clipping. Such implementations can allow for the use of lower power consuming amplifiers such as, for example, a Push-Pull instead of more costly Power Doublers while maintaining the coding efficiency.

The QAM transmitter can split a transmission into subgroups. The QAM transmitter output consists of the summation of these subgroups. As the transmitter constructs its output, subgroups are summed into the QAM transmitter output, for instance sequentially. For each subgroup summed into the QAM transmitter output, a calculated and/or estimated peak power level can be determined for the QAM transmitter output consisting of the addition of a number of subgroups. If the peak power level exceeds a provided threshold, then the QAM transmitter can invert the signal content of the QAM subgroup, thereby generally reducing the peak power level in the QAM transmitter output. Alternately, for each subgroup added to the QAM transmitter output a calculated and/or estimated peak power level can be determined for the QAM transmitter output for the case of an addition of the subgroup signal or for subtraction of the subgroup signal (here subtraction means the addition of the subgroup signal under the condition that the data sign of real and imaginary parts of data into QAM channels constituting the subgroup has been inverted and thus is further referred to as an 'inverted' subgroup). The QAM transmitter can then select addition or subtraction (that is not to invert or to invert the subgroup) of the QAM subgroup to the QAM transmitter output based on which option results in the lowest transmitted peak power. In some implementations, an inversion bit (e.g., constellation data point) or inversion channel can be used to signal explicitly to the QAM receiver that the QAM subgroup has been inverted. In other implementations, a predefined coding group can be ascertained by the QAM receiver to implicitly signal a QAM subgroup inversion. Such implementations can rely on other mechanisms such as, for example, a code table lookup that resides at the QAM receiver. Such a code table may for instance contain codes for inverted and non-inverted data values that are considered equivalent by the receiver.

It should be understood that a QAM optimization can vary based on network characteristics, encoding schemes, QAM subgroup size, and frame size. For example, a latency improvement can be gained for bidirectional cable communication at various latency times such as, for example, where the 200 milliseconds data slice time of the DVB-C2 frame becomes excessive. It should be understood that in this example, the latency can be reduced to 443 microseconds by turning time interleaving off. However, this adversely affects the error correction performance. Note that the transmitter encoding process and the receiver decoding process are such that a delay of 1 millisecond is readily added to the system. This delay exceeds the transmission medium delay. Therefore, it is proposed to select a number of OFDM carriers relevant to, for example, cable system reflection times and frequency responses. A reasonable OFDM carrier spacing would be on the order of, for example, 200 kHz with a 5 microsecond symbol time.

In additional implementations, systems and methods can provide for a QAM transmitter to optimize QAM transmissions by applying a recursive inversion process of QAM blocks to minimize peak output. In such implementations, the QAM transmitter can iteratively apply a subgroup inversion subgroup by subgroup, thereby further reducing peak power transmission and avoid clipping.

In still further implementations, systems and methods can provide for a QAM transmitter to optimize QAM transmissions by suppressing QAM subgroups. In some implementations, the QAM states close to the origin (very low output amplitude) can be assigned to special functions such as indicating that a subgroup is suppressed.

For example, a QAM-4096 with a circular constellation which has a peak-to-RMS ratio per QAM of 2.03 versus 2.45 for a traditional rectangular QAM. Furthermore, the circular QAM constellation has 4112 states, 16 more than QAM-4096, these may encode up to 4 bits that signal one of 16 special states. In such a case, given for instance 32 QAM carriers per subgroup, this provides 128 bits for such special messages. Subgroup suppression is useful to limit the peak output, but can also limit the throughput if too many events take place. A representative example with subgroup suppression has a simulated 0.25% loss of throughput due to suppression. Given the choice of 32 QAM subgroups with for instance 16 QAM channels each for inversion, the throughput is reduced by an additional 0.6%. Therefore, in some instances, subgroup suppression is a more effective method to implement in lieu of subgroup inversion.

FIG. 1 is a block diagram illustrating a high-level broadband communications system for transmitting and receiving QAM signals. In some implementations, a QAM transmitter 110 can send QAM signals to a QAM receiver 120 via a network 130. In some implementations, the network 130 can be a hybrid fiber coax (HFC) network. The QAM transmitter 110 can operate to optimize QAM transmission by inverting one or more QAM sub-groups out of a group of QAM channels when a peak power level is detected for transmission by the transmitter 110 or to minimize peak power in each transmission. In some implementations, the QAM transmitter can explicitly signal a subgroup inversion to the QAM receiver 120. In other implementations, the QAM receiver 120 can ascertain a subgroup inversion based on other factors such as, for example, a code lookup table. The QAM transmitter 110 can also apply a recursive inversion process to further reduce peak power transmissions by determining an optimized scheme of sub-group inversions; that is, to determine which sub-groups need to be inverted to obtain the lowest overall peak output power for the complete group of QAM channels. In alternative implementations, the QAM transmitter 110 can suppress the transmission of certain QAM sub-groups to prevent high peak output power.

Figure 2:
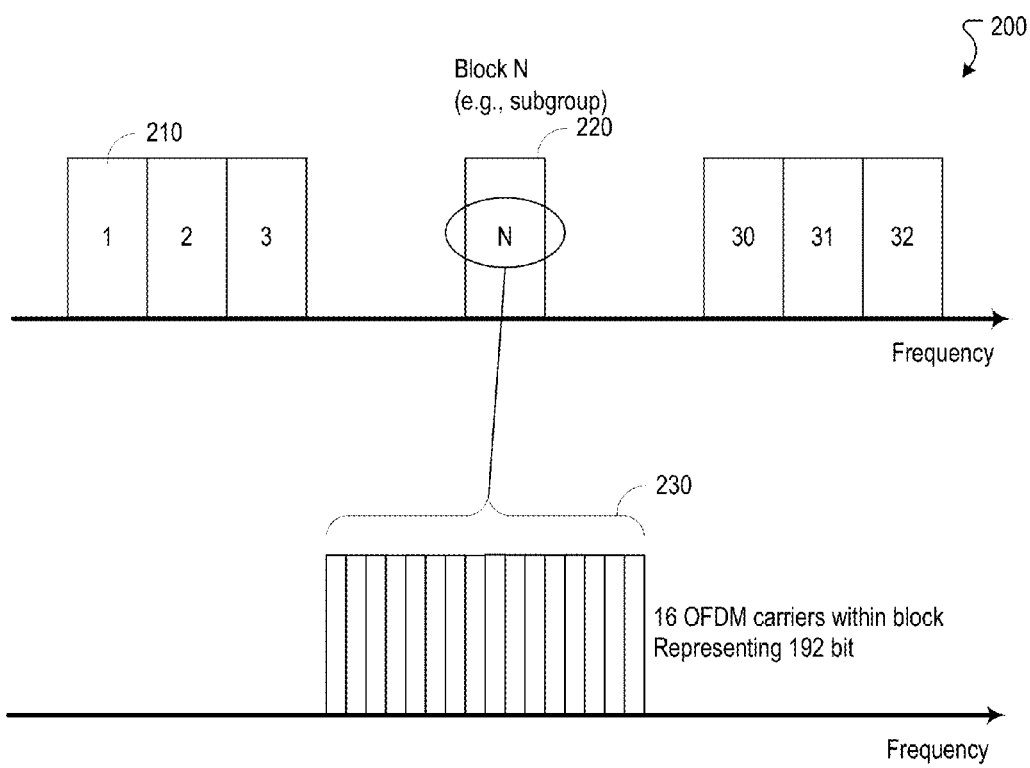
FIG. 2 is an example illustration of the power density of the spectrum as a function of frequency.

FIG. 2 is an example illustration of the power density of the spectrum as a function of frequency. An example implementation was simulated for a system of an approximate data capacity of 1 Gb/s utilizing 200 kHz spaced QAM-4096 OFDM carriers with 12 bit/Hz raw throughput. Each QAM carrier (e.g., QAM group) thus provided 2.4 Mb/s transport rate; 512 QAM carriers were used to support 1.2 Gb/s to the end user within a bandwidth of 100 MHz. After error correction, this may, for instance, result in 1 Gbs net throughput. Each set of transmission symbols can contain 6 k bits of data, with a small overhead (under 1%). A QAM group can contain one or more QAM subgroups. In this example, the 512 OFDM carriers are grouped into 32 blocks 210. Within each Block N 220 (i.e., subgroup), there are 16 OFDM carriers 230 that can encode 12 bits each per transmission. Therefore, for each block 220, 12×16=192 bits are encoded. For each 192-bit code word, there is one code word that represents an output waveform with an inverted polarity. Such code word pairs can be declared equivalent such that 191 independent bits remain. This facilitates inversion of the output voltage waveform of each of the sub-blocks at a cost of a small amount of overhead.

In some implementations, a peak-to-average power reduction scheme can be based on transmit side encoding such that code combinations with excessive peak powers do not occur. This comes at the expense of transmit codes and it will be shown that it can be realized with well under 1% overhead. The 512 QAM carriers are divided into 32 blocks (i.e., subgroups) 220 of 16 QAM-4096 signals 230 each. For each block 220, the transmitter output waveform is computed independently with random data input at each block. When the blocks 220 are combined, the resulting peak power is computed for all blocks combined. The waveform per block 220 is computed not only with the normal data input, but also computed with data signs into the block of QAM channels inverted. As the QAM blocks 220 are combined, a choice is made between normal and inverted data such that the lowest possible peak power results in the output signal.

At the receiver the blocks 220 are decoded as usual and per block of 32 QAM channels a data output is also available. Since there is ambiguity over whether all data has a normal sign or data was inverted, one bit is lost per block. Thus, in this example, an overall 32 bits are lost because one sign bit per block was confiscated to denote whether the subgroup data was inverted or not; a fraction of less than 0.6% of the total data payload. The peak-to-average power ratio however has been reduced significantly leading to an improvement of the power efficiency of the transmission device. This in turn can permit greater transmission distance or lower power dissipation or an improved SNR with greater than 10 bit/Hz net throughput.

Figure 3:
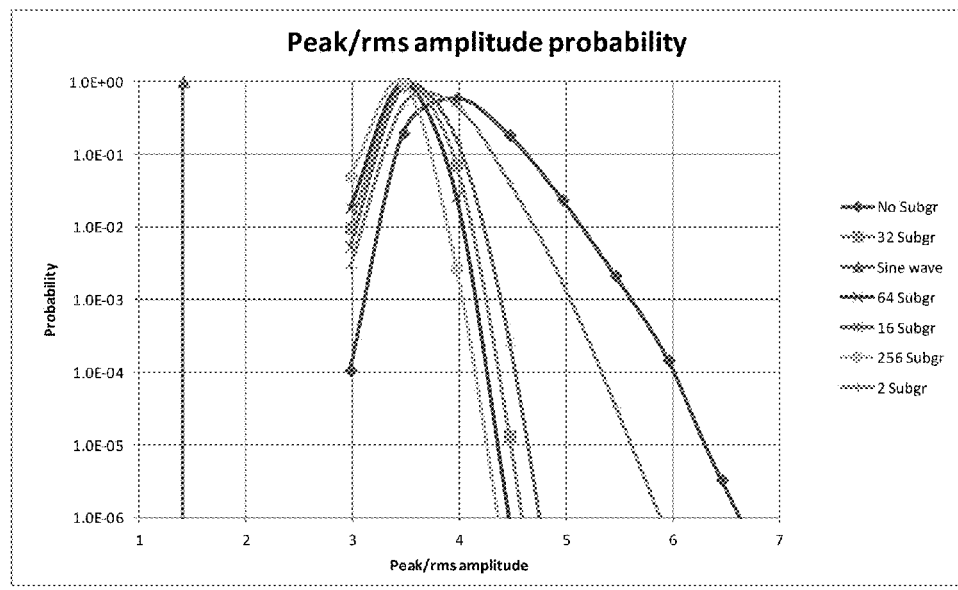
FIG. 3 is an example table and illustration of the peak/average power probability for various QAM subgroups.

FIG. 3 is an example table and illustration of the peak/average power probability for various QAM subgroups. The illustration includes peak/average power probability for the non-optimized case (No subgroup) and with 2, 16, 32, 64 and 256 QAM subgroups. The 1e-6 probability for peak power is about 3 dB (a factor 1.4) lower for the case with 32 QAM subgroups when compared to non-optimized OFDM. For comparison, a simple sine wave is also compared at 1.4. A peak to RMS ratio of around 4.5 can be attained permitting an effective modulation index of about 22% with a 10^-6 probability of clipping. At the transmit side such events are known so that such symbols may not be transmitted at all and replaced by a pair of symbols (at a cost of 10^-6 extra overhead) without the clipping property. Thus, an output signal can be constructed that may not induce amplifier or optics clipping with a minimal overhead. [FIG. 3 has 7 lines in the key, but only 6 on the graph CJA]

Figure 4:
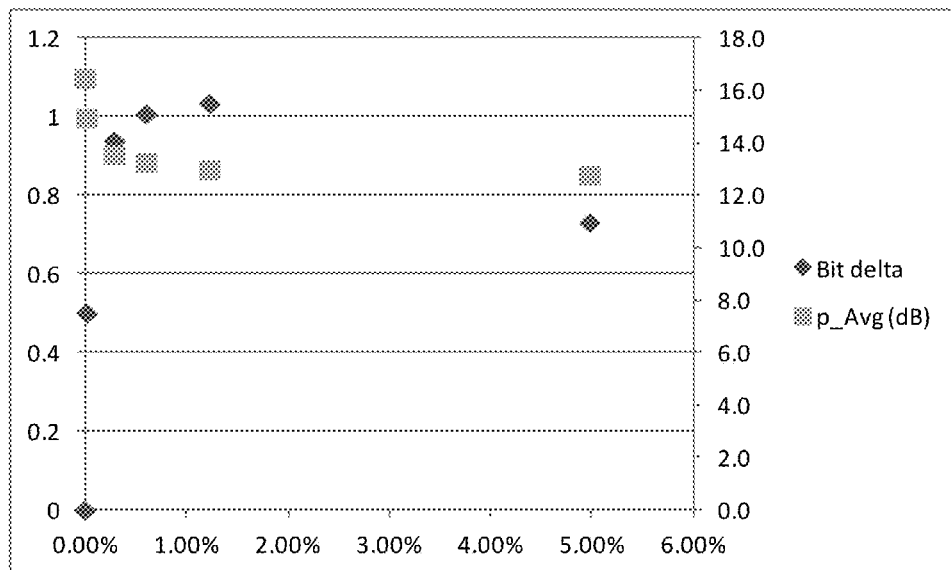
FIG. 4 is an example table and illustration of the amount of overhead and the peak-to-RMS ratio and the net increase in bit throughput.

FIG. 4 is an example table and illustration of the amount of overhead and the peak-to-RMS ratio, where peak is defined as a peak value with 10^-6 probability that it is exceeded, and the net increase in bit throughput. The example illustration and table of the amount of overhead on the x-axis and the peak-to-RMS ratio in dB on the right hand axis (square markers) and the net increase in bit throughput, assuming the improvement in peak-to-RMS ratio is used to increase signal level and thus bit per Hz coding efficiency, on the left hand axis (diamond markers). An overhead of less than 1% is enough to achieve a significant improvement of 1 bit per Hz additional capacity.

The example-simulated results displayed are obtained using a simple decision scheme to invert data to be transmitted. More complex schemes can be devised that may result in a further improvement of peak/average ratios that are attainable. These schemes can include defining a set of symbols that have limited peak/average properties a priori and more complex decision schemes to alter data to be transmitted.

In some implementations, a standard can include the option to shape the output peak/average power ratio by defining and controlling the symbols to be transmitted such that the peak power is reduced. This enables more efficient transmission of such a signal in a plant with amplifiers and optical actives, in contrast to transmission schemes that originate from terrestrial or space transmission that require a linear transmission medium. The example provides for a 3 dB improvement in peak-to-average power ratio, such that OFDM can be used in cable plant without backing off the signal levels relative to standard-QAM.

Figure 5:
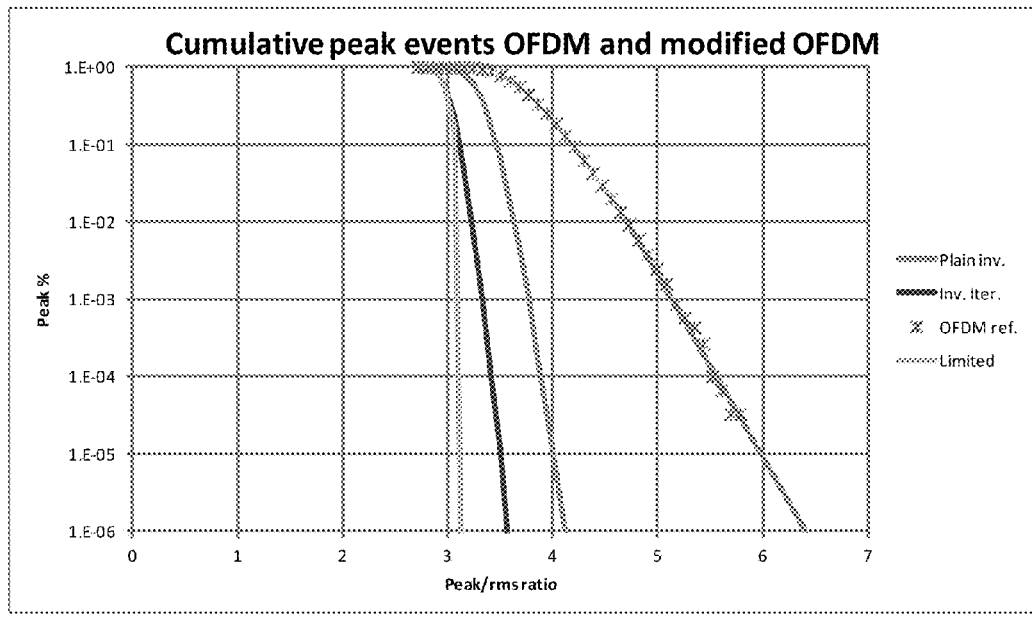
FIG. 5 is an example table and illustration of the cumulative simulation results including recursive inversion and subgroup suppression.

FIG. 5 is an example table and illustration of the cumulative simulation results including recursive inversion and subgroup suppression. The illustration and table of cumulative simulation results are shown with peak-to-average ratio in linear units on the x-axis and cumulative probability on the y-axis on a logarithmic scale. The OFDM reference line shows that 100% of the transmissions have a peak-RMS ratio above 2:1; and 1 parts-per-million (ppm) has a peak-RMS ratio over 6.3:1. Therefore, 1 ppm is determined to be an acceptable error rate due to clipping. In this example, the OFDM reference line for rectangular or circular QAM constellations was nearly the same for a large number of QAM sources (512 in this case). All example simulated results in FIG. 5 are for a circular constellation.

In some implementations, with a plain inversion of subgroups to limit peak output the 1 ppm mark is reached at 4.1:1. In other implementations, with a smarter (recursive or iterative) inversion scheme the 1 ppm point is reduced to 3.6:1. In still further implementations, with suppression of QAM transmission when the channel cannot accommodate it (suppression is per worst offending QAM subgroup), there are no peak outputs above 3.12 times the RMS output. It should be understood that this peak-RMS value is only slightly above the peak-RMS ratio of a single non-optimized QAM (2.45). Thus, the peak-average problem of OFDM has been essentially removed. Clipping events will not take place until an effective optical modulation index of 32%. The peak-RMS ratio can thus be dropped by a factor 2 (6 dB), which permits a higher RMS power in the transmission system and improved SNR resulting in up to 2 bit/Hz additional throughput at a cost of 0.1 bit/Hz for additional encoding.

The additional encoding does not require significant modification in the QAM receiver for decoding. When the QAM channel permits the subgroup transmission, both in terms of time domain and compression headroom, a packet or group of bits that makes up the information present in a subgroup is transmitted. If the transmission does not occur (i.e., suppressed), the transmission of a packet or group of bits is delayed. In this case, a small amount of contention can arise that can be resolved by a short symbol buffer. However, QAM subgroups that have been suppressed in a previous transmission can attain priority in a subsequent transmission. Moreover, it is rare for more than 1 or 2 QAM individual subgroups to be suppressed in any transmission and only a fraction of transmissions have any suppressed QAM subgroups. Thus, it is rare that a particular QAM subgroup would be suppressed for more than one symbol duration and a buffer depth of a few symbols can readily accommodate that lag.

Figure 6:
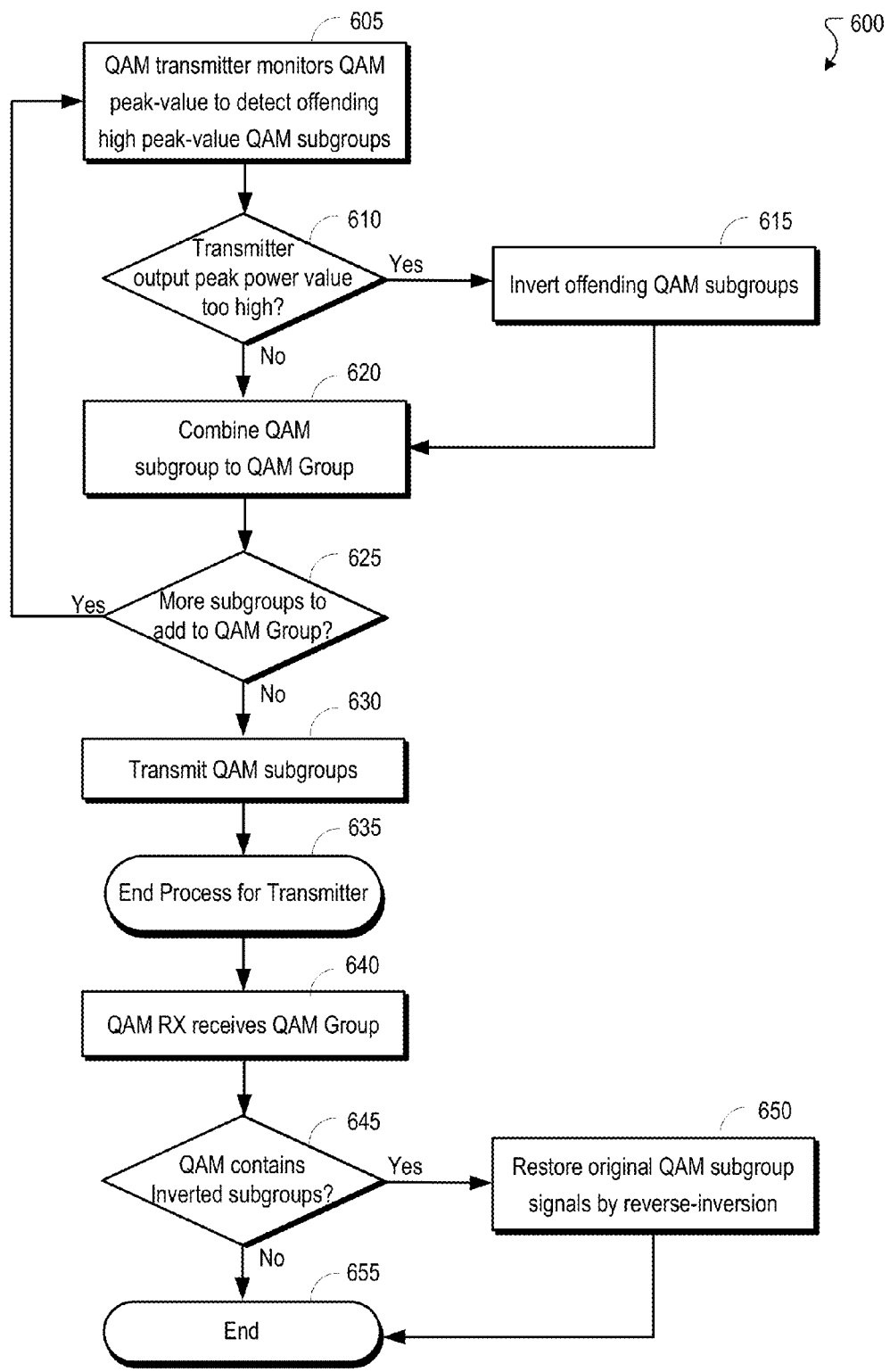
FIG. 6 is a flowchart illustrating an example process operable to optimize QAM transmission by reducing high peak signals levels via a QAM subgroup inversion.

FIG. 6 is a flowchart illustrating an example process operable to optimize QAM transmission by reducing high peak signals levels via a QAM subgroup inversion. The process 600 begins at stage 605 when the QAM transmitter monitors combined QAM peak values based on transmission data in QAM sub groups that are combined into the transmitter output. The monitoring can be performed by a QAM transmitter (e.g., QAM transmitter 110 of FIG. 1). In some implementations, the monitoring need not be explicit, but the inversions of QAM sub-groups can be based on minimizing the combined peak output power in general.

At stage 610, a determination is made whether the combined transmitter output peak power value is too high due to the contribution of a QAM sub-group and if so it will attempt to attain a lower transmitter output peak power value by inverting the QAM sub-group. The determination can be made by a QAM transmitter (e.g., QAM transmitter 110 of FIG. 1). In some implementations, QAM transmitter can sequentially add QAM subgroups into an output and at each addition of a QAM subgroup compare power levels among one addition or subtraction (subtraction being the addition of an inverted QAM subgroup) of the relevant QAM subgroups to determine which one results in the lowest peak output power. In other implementations, the QAM transmitter can have a predefined output power level that initiates one or more QAM subgroup inversions. In alternative implementations, a multi-core processor, more than one processor, or an field programmable gate array (FPGA) can compare one or more subgroup alternatives simultaneously and/or in parallel.

If the addition of a QAM subgroup results in a peak combined output power level that is determined to be too high, then at stage 615, the offending QAM subgroups are inverted. Alternately for each subgroup that is added to the output the subgroup is inverted in case that results in a lower combined peak output power. The inversion can be performed by a QAM transmitter (e.g., QAM transmitter 110 of FIG. 1). In some implementations, the inversion can be a single QAM subgroup. In other implementations, a subset of QAM symbols within a QAM subgroup can be inverted at the expense of additional overhead. The process then proceeds to stage 620.

If the additional output of a QAM subgroup results in a peak combined output power level that is not determined to be too high, then at stage 620, the QAM subgroups are combined (e.g., an addition operation) into the QAM Group for transmission. Alternately, for each subgroup that is added to the output the subgroup is not inverted in case that results in a lower combined peak output power when added to the combined QAM group.

At stage 625, a determination is made whether more subgroups are added to the QAM Group. The determination can be made by a QAM transmitter (e.g., QAM transmitter 110 of FIG. 1). In some implementations, QAM transmitter can add a fixed or variable number of subgroups to the QAM Group before transmitting. In other implementations, the QAM transmitter cease adding additional subgroups once the transmitter output peak power level has reached a certain threshold.

If additional QAM subgroups are determined to be added, then the process returns to stage 605, where the QAM transmitter monitors the next subgroup(s) to detect offending high peak values. The determination can be made by a QAM transmitter (e.g., QAM transmitter 110 of FIG. 1).

If additional QAM subgroups are determined to not be added, then at stage 630, the QAM Group can be transmitted. The transmission can be made by a QAM transmitter (e.g., QAM transmitter 110 of FIG. 1). In some implementations, if the inversion has occurred, the transmitter can explicitly send an inverted QAM subgroup flag on a dedicated inversion flag QAM channel. In other implementations, an invert bit transmitted with the inverted QAM subgroup can signal an inverted QAM subgroup. In still further implementations, the QAM receiver can implicitly ascertain an inverted QAM subgroup based on the transmitted QAM Group using a code lookup table. It should be understood that many methods exists to signal from QAM transmitter to QAM receiver that one or more QAM subgroups are inverted.

At stage 635, the process ends for the transmitter and the QAM Group. In some implementations, QAM transmitter adds a fixed or variable number of subgroups to the QAM Group before transmitting. In other implementations, the QAM transmitter ceases adding additional subgroups once the transmitter output peak power level has reached a certain threshold. It should be understood that the QAM receiver need not be aware of the subgroup inversion method, only that a subgroup is inverted.

At stage 640, the QAM Group is received at the QAM receiver. The QAM Group transmission can be received by a QAM receiver (e.g., QAM receiver 120 of FIG. 1). In some implementations, the QAM receiver will process the QAM immediately upon receipt. In other implementations, the QAM receiver will store the contents of the QAM Group into a buffer for processing at a later time.

At stage 645, a determination is made whether the received QAM Group contains inverted subgroups. The determination can be made by a QAM receiver (e.g., QAM receiver 120 of FIG. 1). In some implementations, the QAM receiver can receive signals within the QAM to indicate an inverted QAM subgroup. In other implementations, the QAM receiver can receive signaling external to the QAM signal to indicate that one or more QAM subgroups have been inverted.

If the QAM Group does not contain inverted subgroups, then the QAM Groups are processed normally and at stage 655, and the process ends. The determination of inversion can be made by a QAM receiver (e.g., QAM receiver 120 of FIG. 1). In some implementations, if the inversion has occurred, the transmitter has explicitly sent an inverted QAM subgroup signal on a dedicated inversion flag QAM channel. In other implementations, an invert bit can be transmitted with the inverted QAM subgroups to signal an inverted QAM subgroup. In still further implementations, the QAM receiver can ascertain an inverted QAM subgroup based on the transmitted QAM using a code lookup table. It should be understood that many methods exists to signal from QAM transmitter to QAM receiver that the QAM is inverted.

If the QAM Group does contain inverted subgroups, then at stage 650, the QAM receiver restores the original QAM Group by reverse-inverting the QAM subgroup data. The inversion can be performed by a QAM receiver (e.g., QAM receiver 120 of FIG. 1). In some implementations, a code lookup table can be used to perform a reverse of the inverted QAM subgroup. In other implementations, a sign change of one or more QAM signals can be performed by the receiver to recover the original QAM subgroup. In still further implementations, the receiver can treat inverted and non-inverted QAM subgroup data sets equivalently such that an inverted and a non-inverted data value recovered by the receiver results in the same data output from the receiver, thus dropping one or more bits per data word put out by the receiver. The process 600 ends at stage 655.

Figure 7:
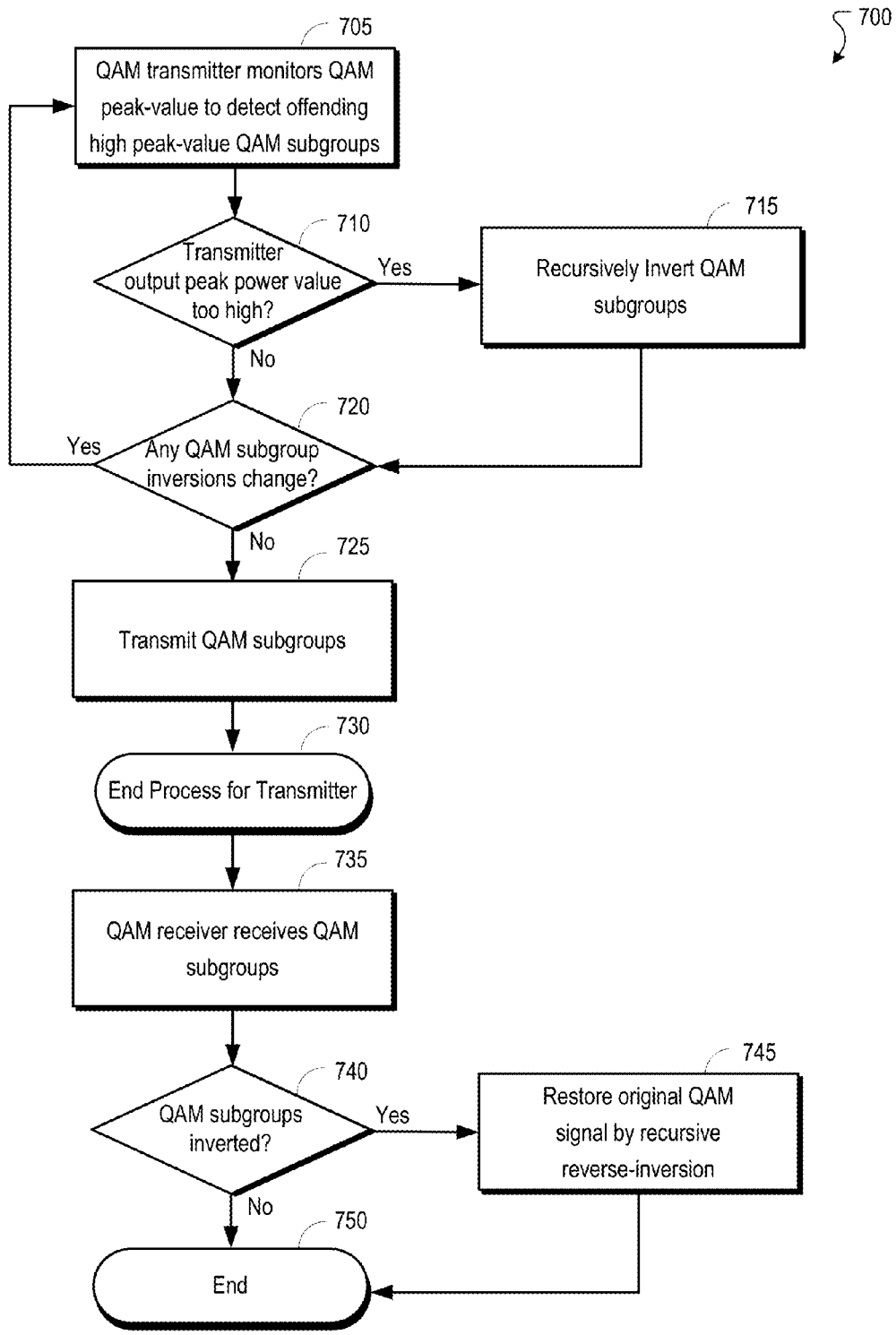
FIG. 7 is a flowchart illustrating an example process operable to optimize QAM transmission by applying a recursive inversion process of QAM blocks to minimize peak output.

FIG. 7 is a flowchart illustrating an example process operable to optimize QAM transmission by applying a recursive inversion process of QAM blocks to minimize peak output. The process 700 begins at stage 705 when the QAM transmitter monitors combined QAM peak output power values based on transmission data in QAM sub groups that are combined into the transmitter output. The monitoring can be performed by a QAM transmitter (e.g., QAM transmitter 110 of FIG. 1). In some implementations, the monitoring need not be explicit, but the inversions of QAM sub-groups can be based on minimizing the combined peak output power in general.

At stage 710, a determination is made whether the combined transmitter output peak power value is too high due to the contribution of a QAM sub-group and, if so, it will attempt to attain a lower transmitter output peak power value by inverting the QAM sub-group. The determination can be made by a QAM transmitter (e.g., QAM transmitter 110 of FIG. 1). In some implementations, the monitoring need not be explicit, but the inversions of QAM sub-groups can be based on minimizing the combined peak output power in general.

If the QAM subgroup power level is determined to be too high, then at stage 715, the QAM subgroups are recursively inverted. The recursive inversion can be performed by a QAM transmitter (e.g., QAM transmitter 110 of FIG. 1). In some implementations, the recursive inversion can performed iteratively via an arithmetic operation (e.g., addition or subtraction) with each additional QAM symbol. In other implementations, a subset of QAM symbols within a QAM subgroup can be recursively inverted based upon individual QAM symbol power level at the cost of additional overhead. The process then proceeds to stage 720 where the determination is made whether a QAM subgroup inversion has changed.

If the QAM subgroup power level is not determined to be too high, then at stage 720, a determination is made whether any QAM subgroup inversion changed. The determination can be made by a QAM transmitter (e.g., QAM transmitter 110 of FIG. 1).

If the QAM subgroup inversion has changed, then the process returns to stage 705, where the QAM transmitter may construct an output signal based on the addition of QAM subgroups and then recursively revisit each QAM subgroup that was added to the output to determine if the addition of the QAM subgroup or the inverted QAM subgroup would have resulted in a reduced peak output power. The QAM transmitter can then invert any of the QAM subgroups that are combined into the QAM transmitter output and after this process revisit all other QAM subgroups to determine if their addition as an inverted or a non-inverted subgroup is still optimal. The transmitter may recursively repeat this process until no more subgroups are found that would benefit from a different choice of inversion or non-inversion as they are added to the combined transmitter output.

If the QAM subgroup inversion has not changed, then at stage 725, the QAM subgroup is transmitted. The transmission can be made by a QAM transmitter (e.g., QAM transmitter 110 of FIG. 1). In some implementations, if the recursive inversion has occurred, the transmitter can explicitly send an inverted QAM subgroup on a dedicated recursive inversion flag QAM channel. In other implementations, an invert bit transmitted with the inverted QAM can signal an inverted QAM subgroup and/or inverted QAM symbol. In still further implementations, the QAM receiver can implicitly ascertain an inverted QAM subgroup and/or QAM symbol based on the transmitted QAM using a code lookup table. It should be understood that many methods exists to signal from QAM transmitter to QAM receiver that the QAM subgroup and/or QAM symbol is inverted. The process 700 ends for the QAM transmitter at stage 730 and proceeds to the QAM receiver at stage 735.

At stage 735, the QAM subgroup is received at the QAM receiver. The QAM subgroup transmission can be received by a QAM receiver (e.g., QAM receiver 120 of FIG. 1). In some implementations, the QAM receiver will process the QAM immediately upon receipt. In other implementations, the QAM receiver will store the contents of the QAM subgroup into a buffer for processing at a later time.

At stage 740, a determination is made whether the received QAM subgroup is recursively inverted. The determination can be made by a QAM receiver (e.g., QAM receiver 120 of FIG. 1). In some implementations, the QAM receiver can receive signals within the QAM to indicate an inverted QAM subgroup and/or QAM symbol. In other implementations, the QAM receiver can receive signaling external to the QAM signal to indicate that a QAM subgroups and/or QAM symbols have been inverted. It should be understood that the receiver need not understand how the subgroup inversion process was accomplished, and only whether a given subgroup was inverted.

If the QAM contains subgroups that are determined not to have inverted subgroups, then the QAM subgroups are processed normally and at stage 750, and the process ends. The determination of inversion can be made by a QAM receiver (e.g., QAM receiver 120 of FIG. 1). In some implementations, if the inversion has occurred, then the transmitter has explicitly sent an inverted QAM subgroup and/or QAM symbol on a dedicated inversion flag QAM channel. In other implementations, an invert bit or code can be transmitted with the inverted QAM to signal a recursive inverted QAM subgroups and/or QAM symbol. In still further implementations, the QAM receiver can ascertain an inverted QAM subgroups based on the transmitted QAM using a code lookup table. It should be understood that many methods exists to signal from QAM transmitter to QAM receiver that the QAM subgroups are inverted.

If the QAM contains subgroups is determined to have inverted subgroups, then at stage 745, the QAM receiver restores the original QAM subgroups by reverse-inversion of the QAM subgroups and/or QAM symbol. The inversion can be performed by a QAM receiver (e.g., QAM receiver 120 of FIG. 1). In some implementations, a code lookup table can be used to find a reverse of the inverted QAM. In other implementations, one or more arithmetic operations can be performed by the QAM receiver to recover the original QAM subgroups and/or QAM symbols. In still further implementations, the receiver can treat inverted and non-inverted QAM subgroup data sets equivalently such that an inverted and a non-inverted data value recovered by the receiver results in the same data output from the receiver, thus dropping one or more bits per data word put out by the receiver. The process 700 ends at stage 750.

Figure 8:
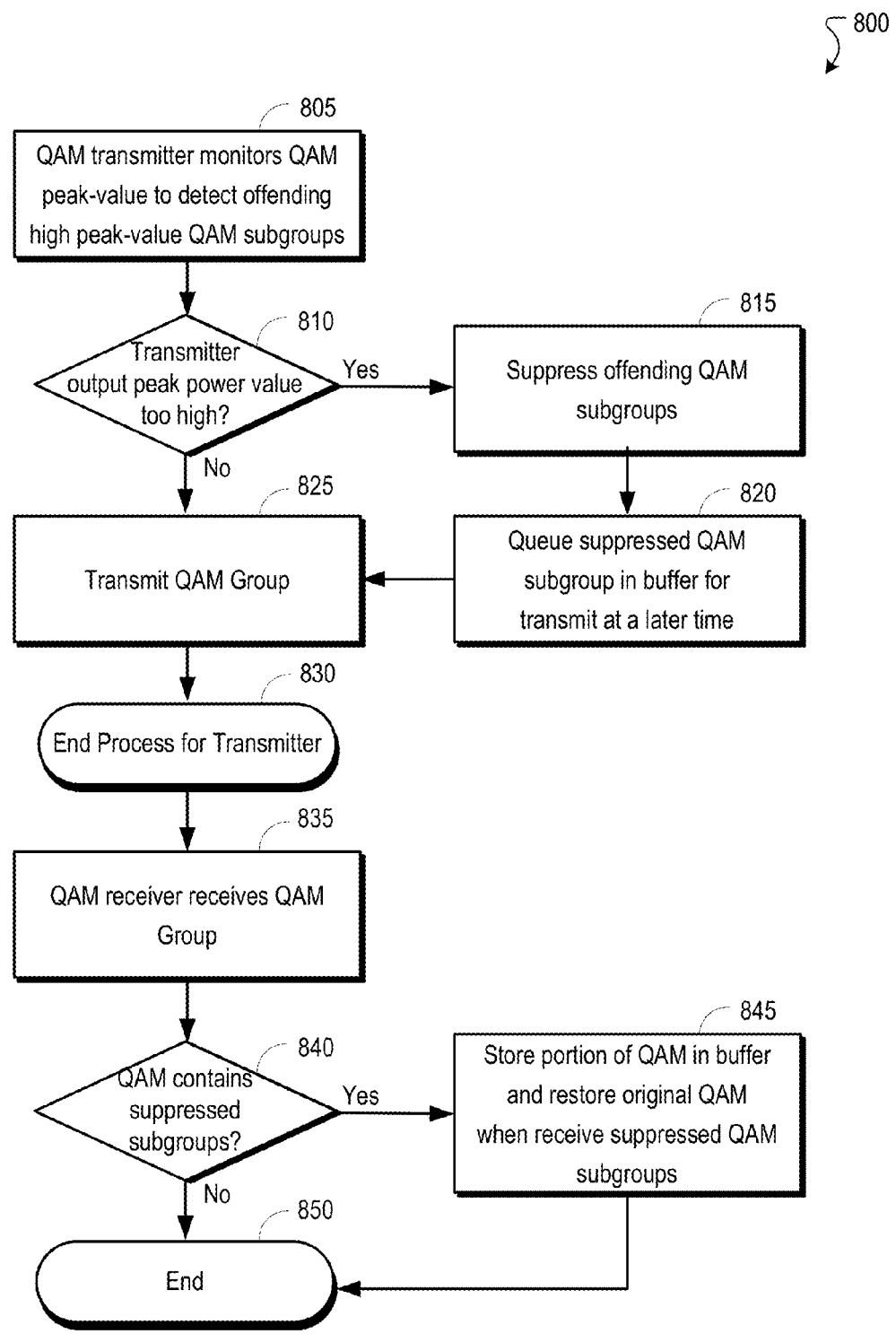
FIG. 8 is a flowchart illustrating an example process operable to optimize QAM transmission by suppressing QAM subgroups.

FIG. 8 is a flowchart illustrating an example process operable to optimize QAM transmission by suppressing QAM subgroups. The process 800 begins at stage 805 when the QAM transmitter monitors combined QAM peak output power values based on transmission data. The monitoring can be performed by a QAM transmitter (e.g., QAM transmitter 110 of FIG. 1).

At stage 810, a determination is made whether the combined QAM peak output power value is too high. The determination can be made by a QAM transmitter (e.g., QAM transmitter 110 of FIG. 1). In some implementation, QAM transmitter can compare power levels among one or more QAM subgroups to determine which QAM subgroup contributes the most to a high output peak power level. Furthermore the QAM transmitter can suppress transmission of such a QAM subgroup in case the combined output power would otherwise exceed a predefined output power level.

If the combined output power level is determined to be too high, then at stage 815, a QAM subgroup and/or QAM symbols contained in the subgroup is suppressed. The suppression can be performed by a QAM transmitter (e.g., QAM transmitter 110 of FIG. 1). In some implementations, the suppression can be an entire QAM subgroup. In other implementations, a subset of QAM symbols within a QAM subgroup can be suppressed.

At stage 820, the suppressed QAM subgroup and/or QAM symbol can be buffered to transmit at a later time. The buffering can be performed by a QAM transmitter (e.g., QAM transmitter 110 of FIG. 1). In some implementation, the buffer can be a local data store residing at the QAM transmitter. In other implementations, the buffer can be a data store connected to the QAM transmitter. It should be understood that various methods can be applied to prioritize buffered and suppressed QAM subgroups and/or symbols. The process then proceeds to stage 825 where the QAM Group and/or symbol is transmitted.

If the combined output power level is not determined to be too high, then at stage 825, all QAM subgroups are combined to the QAM Group and transmitted. The transmission can be made by a QAM transmitter (e.g., QAM transmitter 110 of FIG. 1). In some implementations, if the suppression has occurred, the transmitter can explicitly send a suppressed QAM subgroup on a dedicated suppressed QAM channel. In other implementations, a suppression bit can be transmitted with the suppressed QAM to signal a suppressed QAM subgroup. In still further implementations, the QAM receiver can implicitly ascertain a suppressed QAM subgroup based on the transmitted QAM using a code lookup table. It should be understood that many methods exists to signal from QAM transmitter to QAM receiver that the QAM subgroup is suppressed. The process 800 ends for the QAM transmitter at stage 830 and proceeds to the QAM receiver at stage 835.

At stage 835, the QAM Group is received at the QAM receiver. The QAM Group transmission can be received by a QAM receiver (e.g., QAM receiver 120 of FIG. 1). In some implementations, the QAM receiver will process the QAM immediately upon receipt. In other implementations, the QAM receiver will store the contents of the QAM Group into a buffer for processing at a later time.

At stage 840, a determination is made whether the received QAM Group has a QAM subgroup and/or symbol has been suppressed. The determination can be made by a QAM receiver (e.g., QAM receiver 120 of FIG. 1). In some implementations, the QAM receiver can receive signals within the QAM to indicate a suppressed QAM subgroup and/or symbol. In other implementations, the QAM receiver can receive signaling external to the QAM signal to indicate that a QAM subgroup and/or symbol is suppressed.

If a QAM subgroup is determined not to be suppressed, then the QAM Group is processed normally at stage 850, and the process ends. The determination of suppression can be made by a QAM receiver (e.g., QAM receiver 120 of FIG. 1). In some implementations, if the suppression has occurred, the transmitter has explicitly sent a suppressed QAM subgroup and/or symbol on a dedicated suppressed QAM channel. In other implementations, a suppressed bit or signal can be transmitted with the QAM Group to signal a suppressed QAM subgroup and/or symbol. In still further implementations, the QAM receiver can ascertain a suppressed QAM subgroup and/or symbol based on the transmitted QAM Group using a code lookup table. It should be understood that many methods exists to signal from QAM transmitter to QAM receiver that the QAM is suppressed.

If a QAM subgroup is determined to be suppressed, then at stage 845, the QAM receiver stores the QAM group in a buffer and restores the original QAM Group by combining the suppressed QAM subgroup and/or symbol at a later time or takes the penalty of losing the suppressed QAM subgroup and/or symbol. The restoring can be performed by a QAM receiver (e.g., QAM receiver 120 of FIG. 1). In another implementation, additional error correction methods can be performed by the receiver to recover the original QAM subgroup. The process 800 ends at stage 850.

Figure 9A:
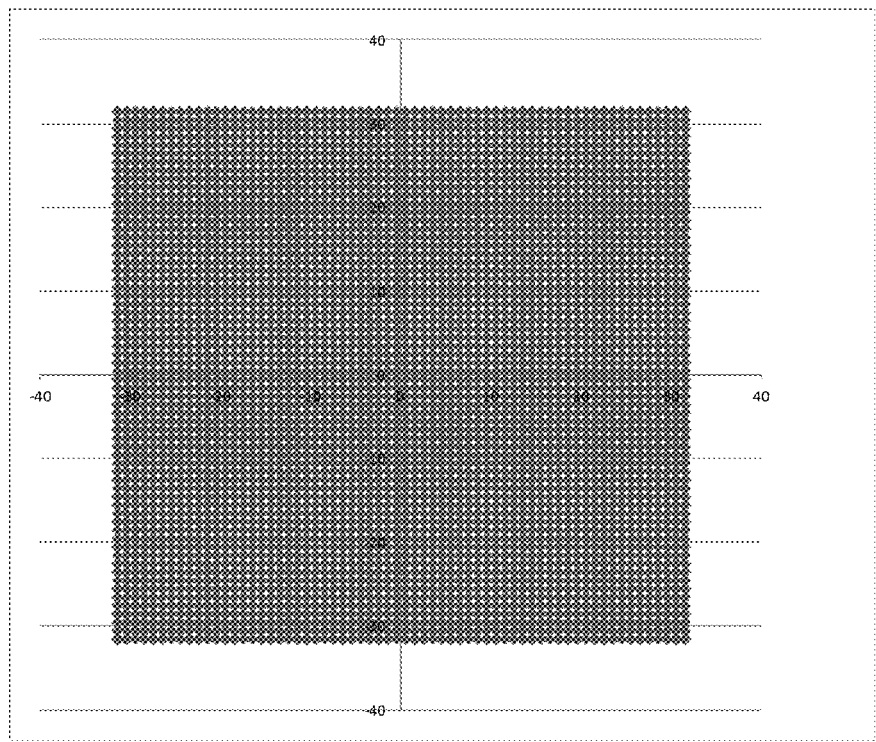
FIG. 9A is an example illustration of a rectangular QAM constellation.

FIG. 9A is an example illustration of a rectangular QAM constellation. In this example implementation, a rectangular QAM4096 constellation, with an example peak amplitude of 44.5 at the corners. The example represents a traditional QAM4096 constellation that may be operable to provide optimized QAM transmission. Codes on the outer edges of the constellation represent higher peak amplitude power requirements. However, although a traditional constellation can be used to provide optimized QAM transmissions, other methods such as, for example, a circular constellation can be used to efficiently represent QAM codes while providing for high peak-value power transmissions. It should be understood that other QAM constellations are available to implement optimized QAM transmission.

Figure 9B:
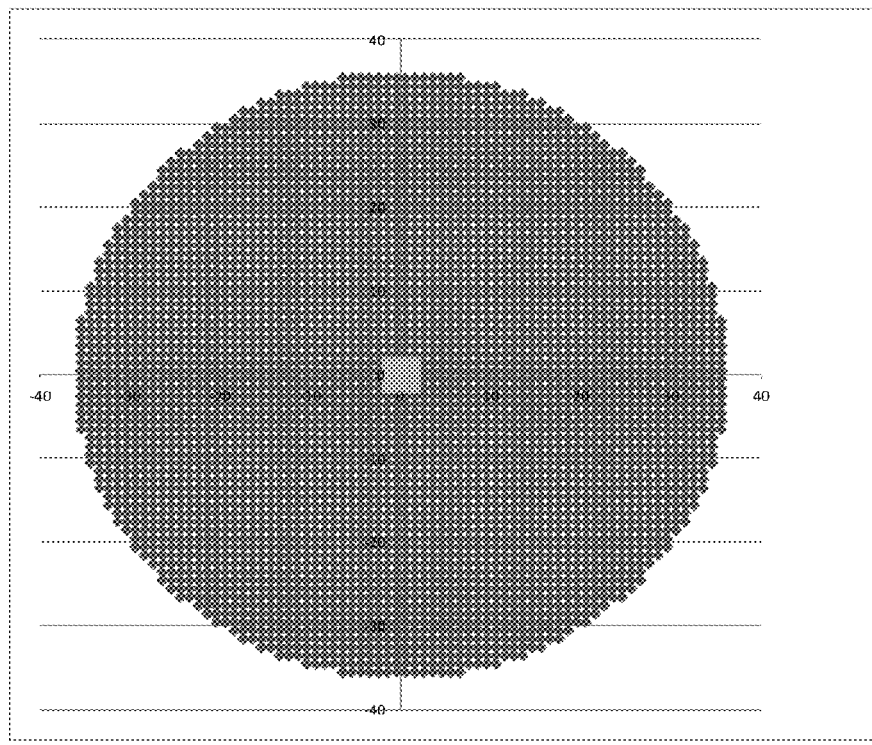
FIG. 9B is an example illustration of a circular QAM constellation resulting from optimizing QAM transmissions by suppressing QAM subgroups.

FIG. 9B is an example illustration of a circular QAM constellation resulting from optimizing QAM transmissions by suppressing QAM subgroups. The example illustration can correspond with simulated efficiency results of, for example, the simulation displayed in FIG. 5. The circular QAM constellation plot can be designed with 4112 states, the peak amplitude of approximately 36. In this example implementation, X-marked are the 16 extra states above QAM4096 that can be used to signal that the QAM channel is off and to encode 4 bits of suppressed state information. The extra states can be operable to provide extra data bits to signal suppressed, high peak-value QAM subgroups. This can be accomplished for QAM4096 with a circular constellation, which has a peak-to-RMS ratio per QAM of, for example, 2.03 versus 2.45 for rectangular QAM. The states close to the origin, which have very low output amplitude, can be assigned to special functions such a indicating that a subgroup is suppressed. In some implementations, given 32 QAM carriers per sub-group, this provides 128 bits for such special messages. Subgroup suppression is useful to limit the peak output, but can also limit the throughput if too many events take place. The example with subgroup suppression has a 0.25% loss of throughput due to suppression. Given the choice of 32 QAM subgroups for inversion the throughput can be further reduced by approximately 0.6% for the inversion (see FIG. 5) so that the total reduction in data throughput is still under 1%

The circular QAM constellation displayed in FIG. 9B displays an example method whereby the lowest amplitudes are used to signal that a QAM channel was suppressed. Thus, a QAM transmission that was "off" or "suppressed" uses those low amplitude states to signal that condition to the receiver. It should be understood that other circular QAM constellations, which provide for more or less variable extra data bits, are available to implement optimized QAM transmission. In alternative implementations, a circular QAM constellation with no extra data bits can be used to optimize QAM transmission.

Figure 10:
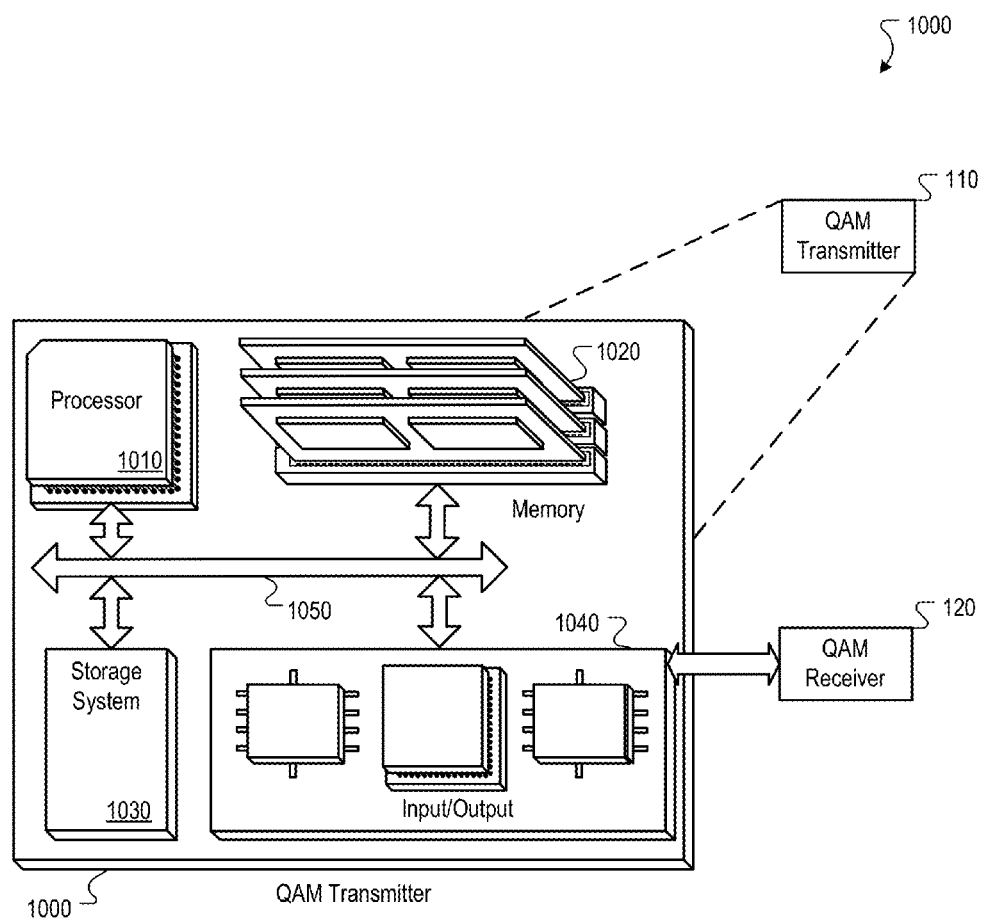
FIG. 10 is a block diagram illustrating an example broadband communications device operable to provide optimized QAM transmission.

FIG. 10 is a block diagram illustrating an example broadband communications device operable to provide optimized QAM transmission. The device 1000 with can include a processor 1010, a memory 1020, a storage device 1030, and an input/output device 1040. Each of the components 1010, 1020, 1030, and 1040 can, for example, be interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030.

The memory 1020 stores information within the device 1000. In one implementation, the memory 1020 is a computer-readable medium. In one implementation, the memory 1020 is a volatile memory unit. In another implementation, the memory 1020 is a non-volatile memory unit.

In some implementations, the storage device 1030 is capable of providing mass storage for the device 1000. In one implementation, the storage device 1030 is a computer-readable medium. In various different implementations, the storage device 1030 can, for example, include a hard disk device, an optical disk device, flash memory or some other large capacity storage device.

The input/output device 1040 provides input/output operations for the device 1000. In one implementation, the input/output device 1040 can include one or more of a QAM receiver 120 (e.g., QAM receiver 120 of FIG. 1) such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., QAM receiver 120), as well as sending communications to, and receiving communications from various networks.

The device (e.g., a modem device) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a phone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. An optimized quadrature amplitude modulation (QAM) transmission system comprising:
    an interface operable to transmit QAM symbol data;
    a transmission module operable to predict a peak power value expected for transmission of a given set of QAM symbol data; and
    the transmission module further operable to dynamically adjust a subgroup of QAM symbol data based on the predicted peak power value to reduce peak power value used to transmit QAM symbol data below a threshold;
    wherein the transmission module is operable to dynamically adjust QAM symbol data to reduce the predicted peak power value by delaying QAM symbol data transmission by storing QAM symbol data in a data buffer, a depth of the data buffer being managed by prioritizing transmissions of input data that has been buffered.

2. The optimized QAM transmission system of claim 1 wherein the adjustment of QAM symbol data includes at least a suppression of QAM symbols.

3. The optimized QAM transmission system of claim 2 wherein the adjustment of QAM symbol data is a delay of QAM symbol data transmission.

4. The optimized QAM transmission system of claim 3 wherein the delay is accomplished by storing QAM symbol data in a data buffer.

5. The optimized QAM transmission system of claim 1 wherein the adjustment of QAM symbol data includes at least an inversion of QAM symbol data.

6. The optimized QAM transmission system of claim 5 wherein the inversion of QAM symbol data is performed recursively.

7. The optimized QAM transmission system of claim 1 wherein the adjustment of QAM symbol data is an inversion of QAM signal sign.

8. The optimized QAM transmission system of claim 7 wherein the inversion of QAM symbol data is performed recursively.

9. The optimized QAM transmission system of claim 1 wherein the adjustment is based on a choice between equivalent transmitted data patterns to represent QAM symbol data wherein patterns are chosen to result in a reduced peak power value.

10. A method for optimizing quadrature amplitude modulation (QAM) transmission, comprising:
    predicting a peak power value resulting from a given set of QAM symbol data;
    adjusting a subgroup of the QAM symbol data based on the predicted peak power value to reduce peak power value used to transmit QAM symbol data; and
    transmitting QAM symbol data via the QAM transmitter;
    receiving QAM symbol data via a QAM receiver;
    detecting an adjustment to the subgroup QAM symbol data; and
    recovering the original QAM symbol data;
    wherein adjusting QAM symbol data performs an inversion of a subgroup of QAM symbol data, the inversion of the subgroup of QAM symbol data being performed recursively within the subgroup of QAM symbol data.

11. The method of claim 10 wherein adjusting QAM symbol data is based on a choice between equivalent transmitted data patterns to represent QAM symbol data wherein patterns are chosen with a reduced peak power value.

12. The method of claim 10 wherein adjusting QAM symbol data results in a delay of QAM symbol data transmission.

13. The method of claim 12 wherein the delay is accomplished by storing QAM symbol data in a data buffer, a depth of the data buffer being managed by prioritizing transmission of input data that has been buffered.

14. A method for optimizing quadrature amplitude modulation (QAM) transmissions, comprising:
    predicting a peak power value resulting from a given set of QAM symbol data;
    adjusting a subgroup of the QAM symbol data based on the predicted peak power value to reduce peak power value used to transmit QAM symbol data;
    transmitting QAM symbol data via the QAM transmitter;
    receiving QAM symbol data via a QAM receiver;
    detecting an adjustment to the subgroup QAM symbol data; and
    recovering the original QAM symbol data;
    wherein adjusting QAM symbol data results in a delay of QAM symbol data transmission, and the delay is accomplished by storing QAM symbol data in a data buffer, the data buffer depth being managed by prioritizing transmission of input data that has been buffered.

15. A method for optimizing quadrature amplitude modulation (QAM) transmission, comprising:
    predicting a peak power value resulting from a given set of QAM symbol data;
    dynamically suppressing a subgroup of QAM symbol data based on the predicted power value to reduce peak power value used to transmit QAM symbol data; and
    transmitting QAM symbol data via the QAM transmitter;
    receiving QAM symbol data via a QAM receiver; and
    detecting a suppressed subgroup of QAM symbol data;
    wherein dynamically suppressing QAM symbol data results in a delay of QAM symbol data transmission by storing by storing QAM symbol data in a data buffer, a depth of the data buffer being managed by prioritizing transmission of input data that has been buffered.

16. The method of claim 15 wherein the QAM symbol data constellation is a circular QAM constellation.

17. The method of claim 16 wherein the circular QAM constellation contains one or more extra constellation states used to indicate the suppressed subgroup of QAM symbol data.

18. The method of claim 15 wherein the combined QAM signals constitute an OFDM signal.

* * * * *